April 26, 1960 L. M. MASON 2,934,099
MACHINE FOR WINDING AND INSERTING COILS
Filed April 8, 1957 9 Sheets-Sheet 1
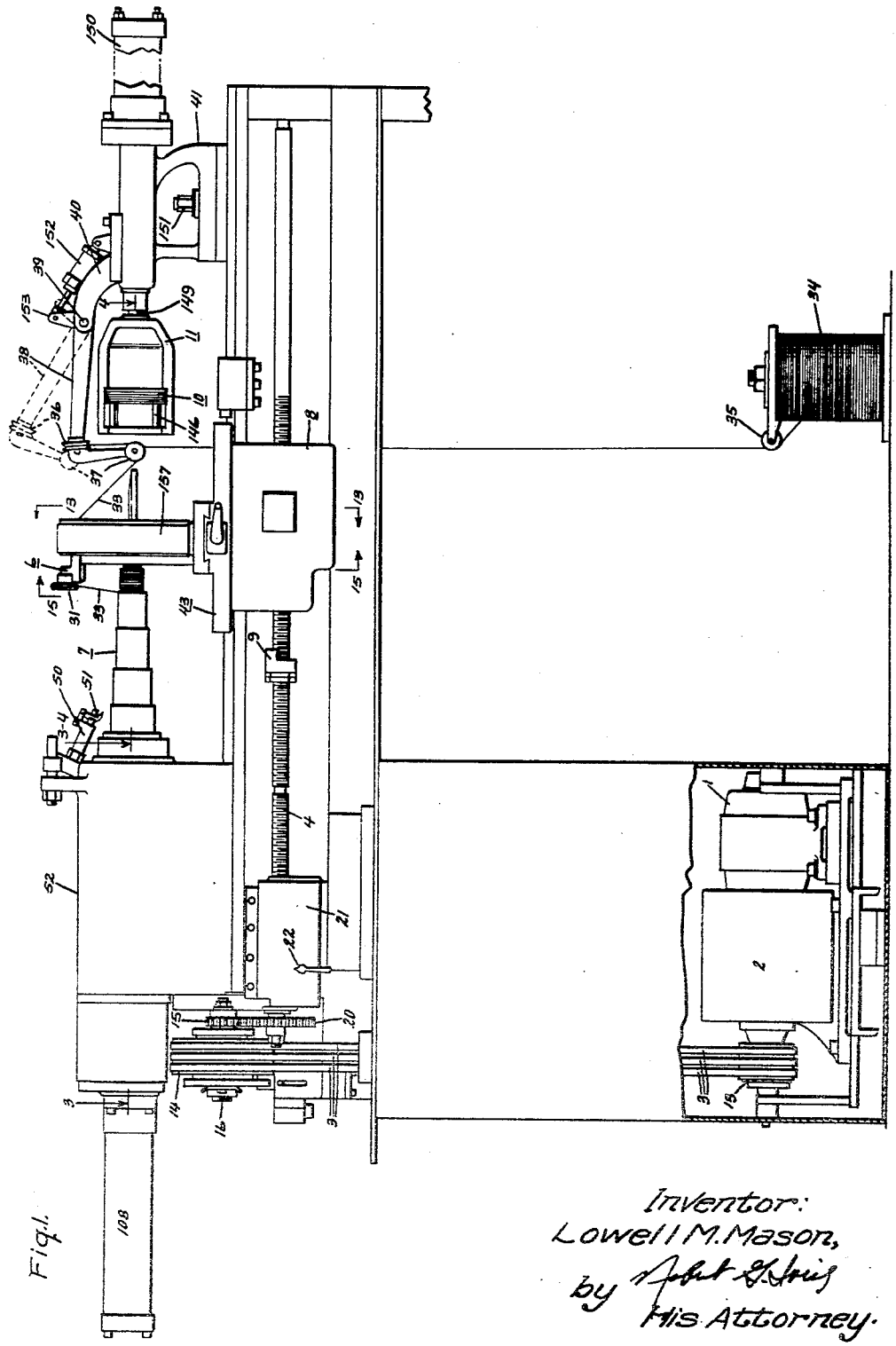
Inventor:
Lowell M. Mason,
by [signature]
His Attorney.

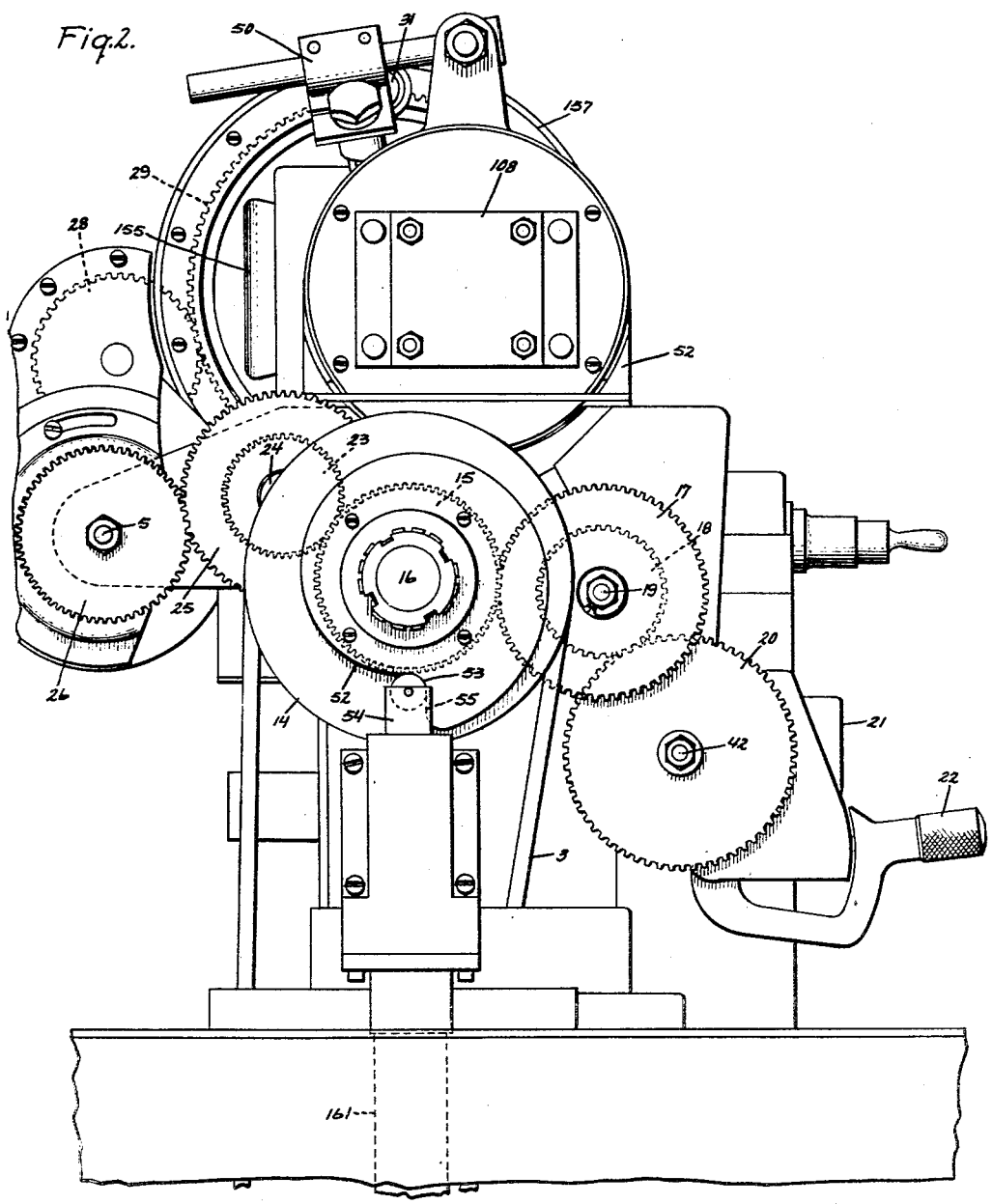

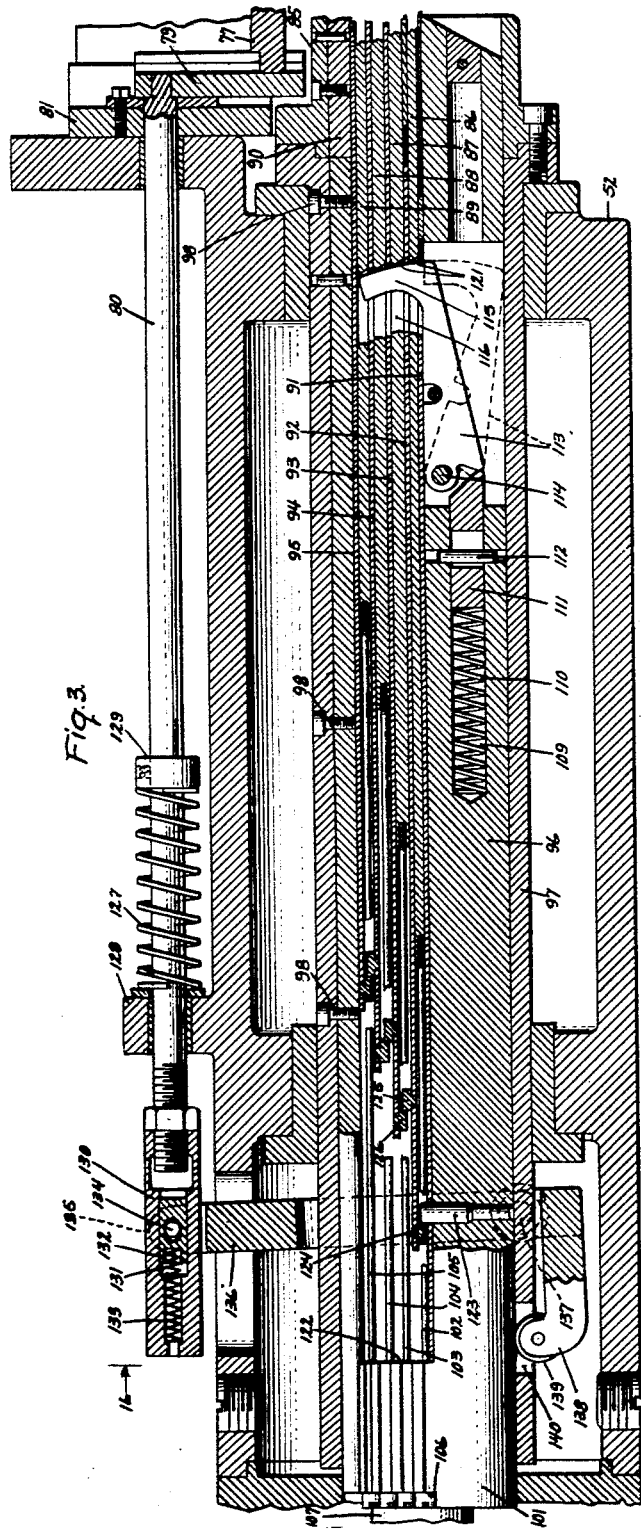

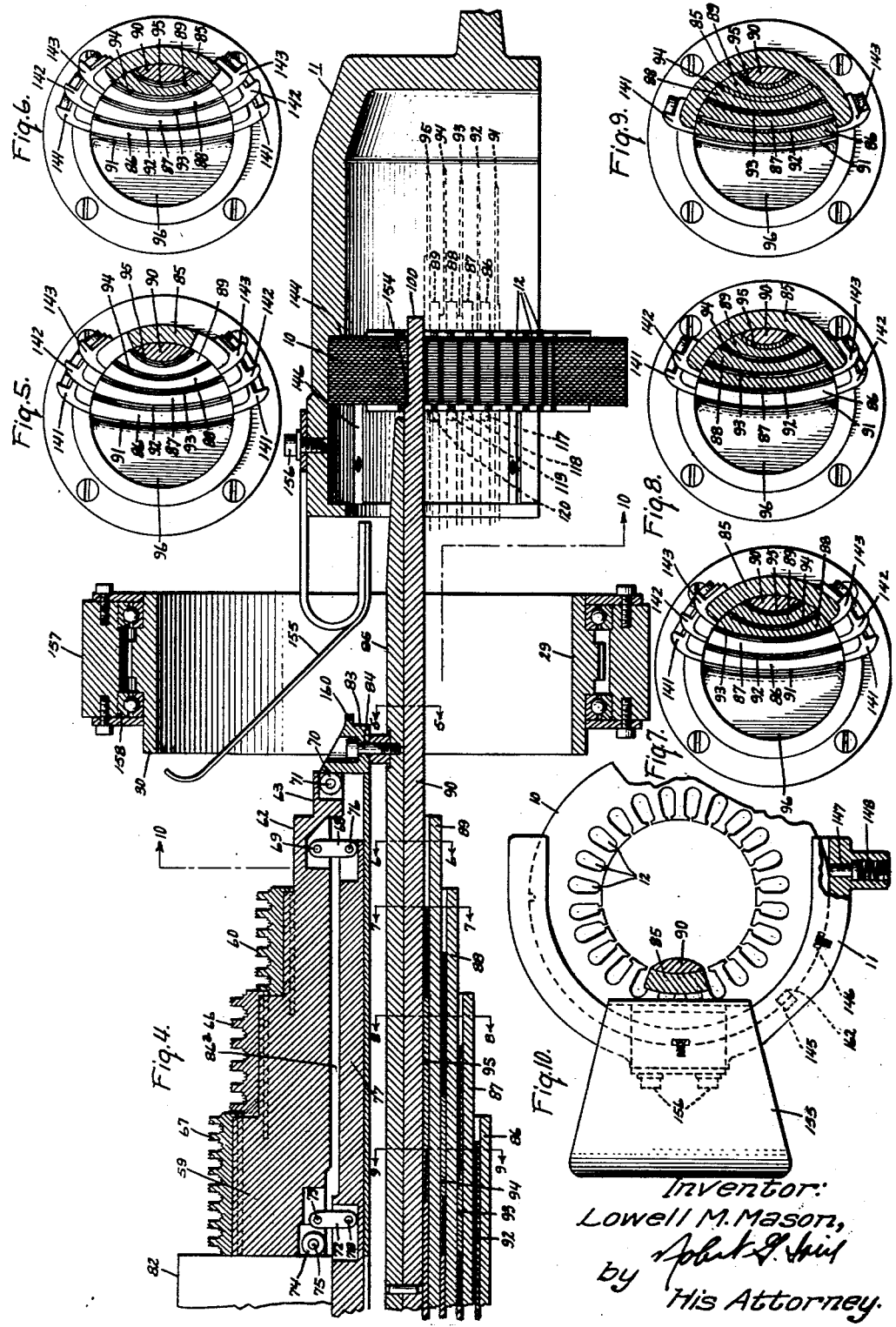

Inventor:
Lowell M. Mason,
by
His Attorney.

April 26, 1960 L. M. MASON 2,934,099
MACHINE FOR WINDING AND INSERTING COILS
Filed April 8, 1957 9 Sheets-Sheet 6
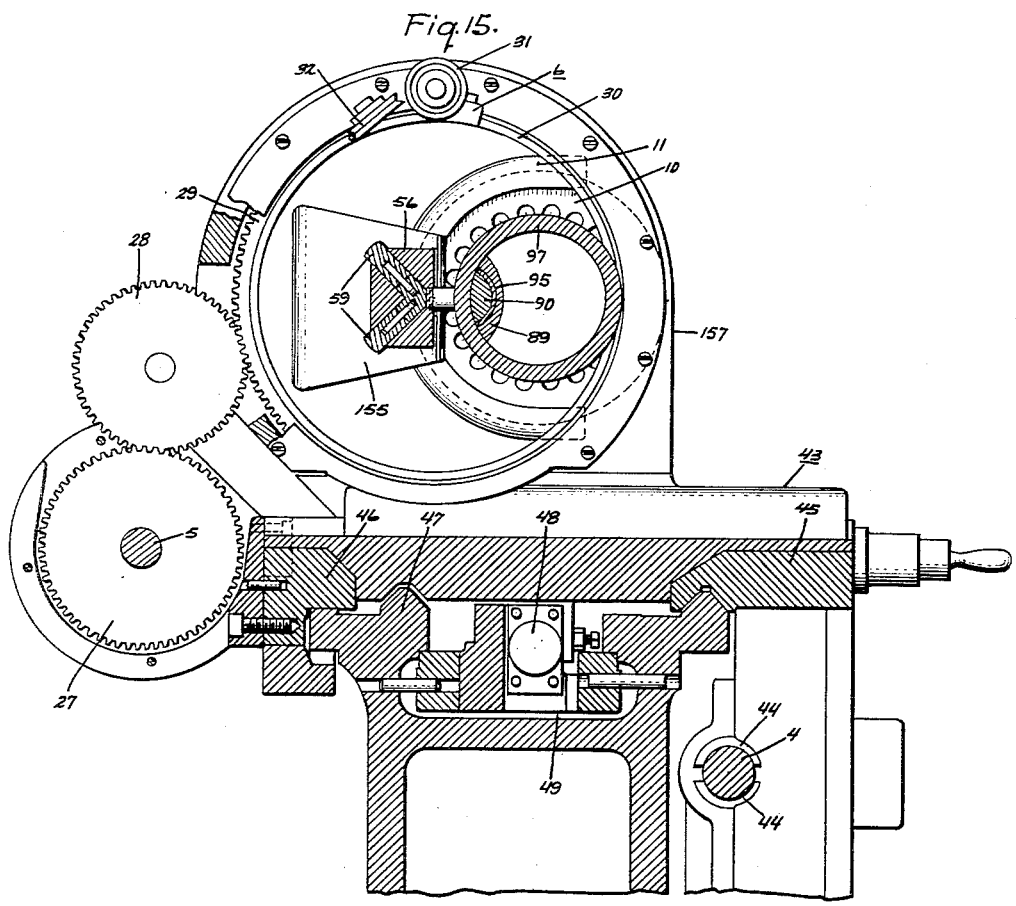
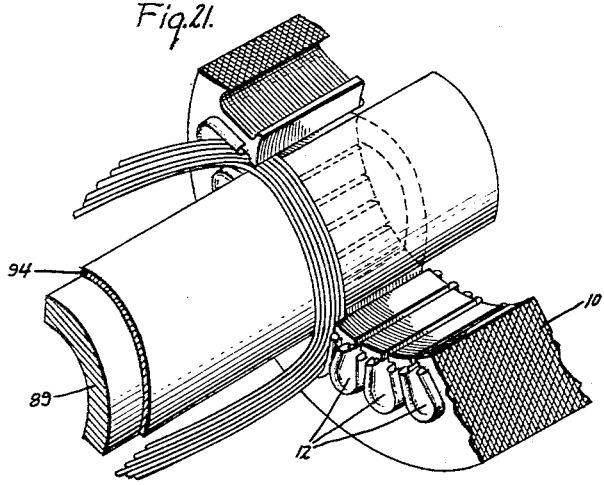
Inventor:
Lowell M. Mason,
by Robt G. Irish
His Attorney.

Inventor:
Lowell M. Mason,
by
His Attorney.

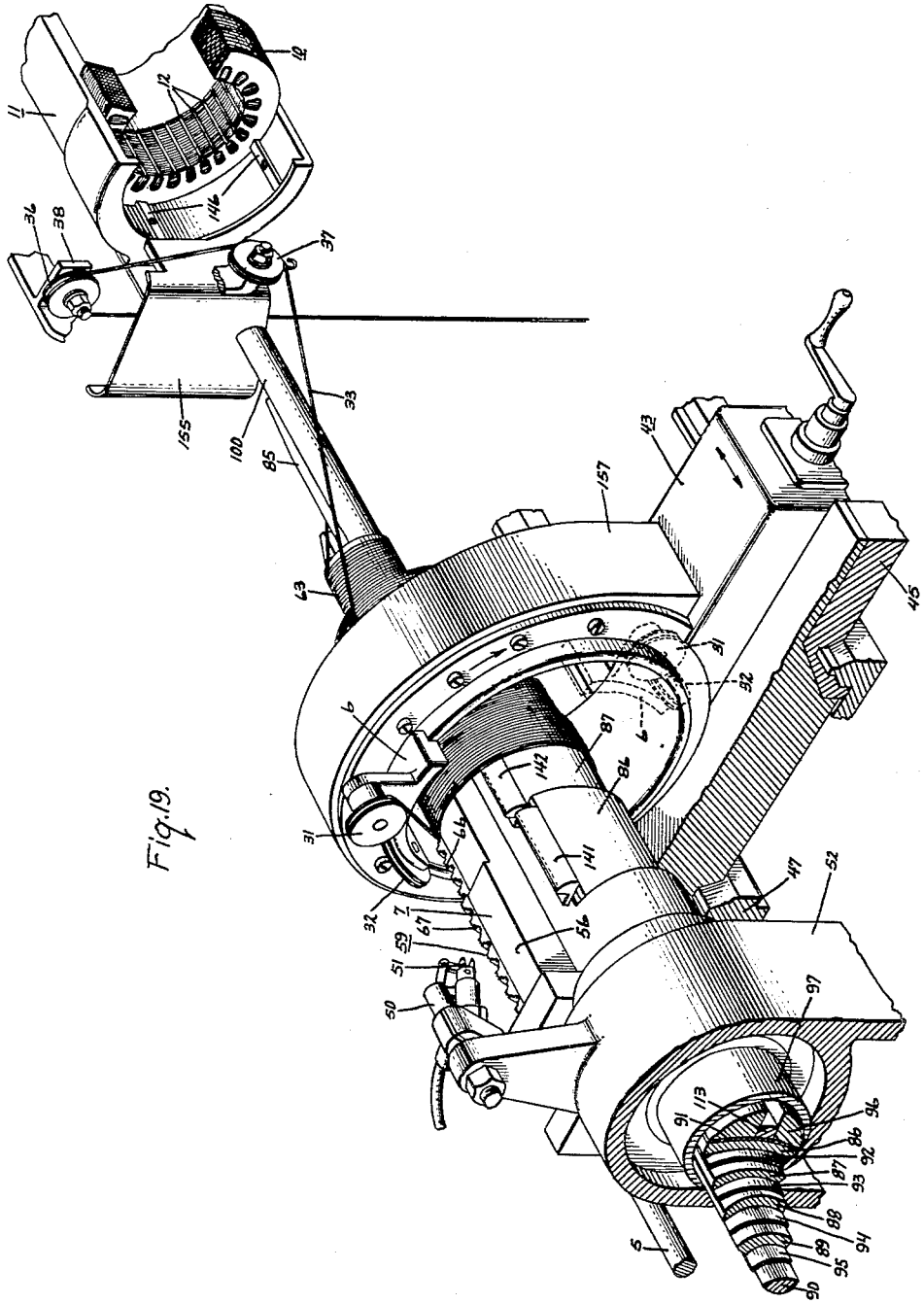

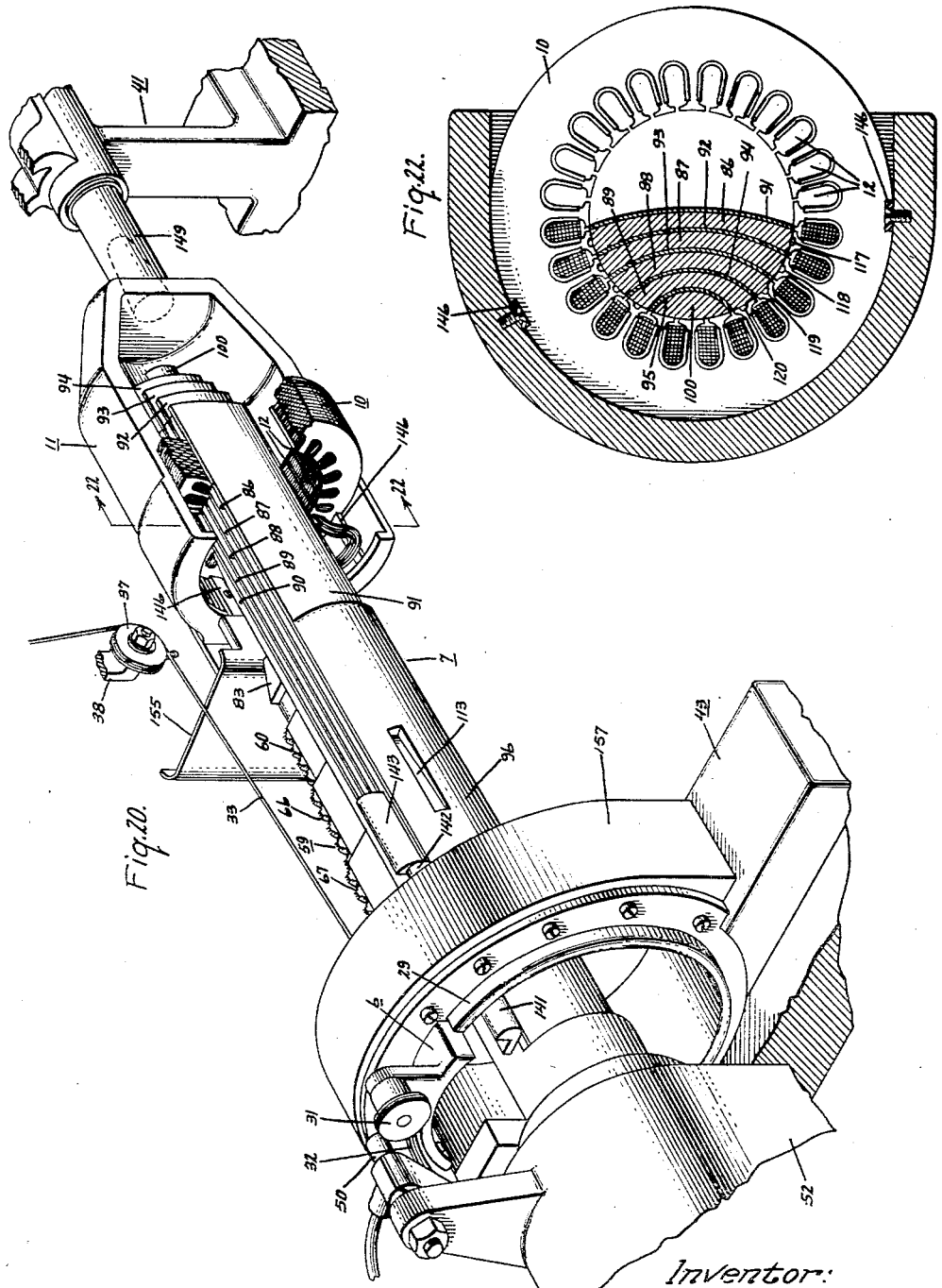

United States Patent Office 2,934,099
Patented Apr. 26, 1960

2,934,099

MACHINE FOR WINDING AND INSERTING COILS

Lowell M. Mason, Fort Wayne, Ind., assignor to General Electric Company, a corporation of New York Application April 8, 1957, Serial No. 651,479

9 Claims. (Cl. 140—92.1)

This invention relates to apparatus for winding coils for magnetic core members of dynamoelectric machines, and more particularly to a machine for preforming coils and subsequently placing them in an internally slotted stator core.

In the usual dynamoelectric machine construction, and especially in the small induction motors which probably make up the majority of such machines, there are provided, first, a rotatable rotor member having conductors positioned thereon, and, second, a stationary stator member. The stator has a core composed of magnetic material and a predetermined number of coils of wire are positioned in slots formed in the core so as to provide poles. The running of such motors—in the case of induction motors—is effected by the interaction of the stator coil current and the inducted current in the rotor conductors, which, in effect, set up a rotating field in the stator. For a given frequency and a given voltage, the field will rotate from pole to pole at a predetermined speed regardless of the total number of poles provided on the stator. Because of this, all other factors being maintained equivalent, a two pole induction-type motor will rotate twice as fast as a four pole induction-type motor since in the latter the electrical field must pass through twice as many poles per revolution. The higher speed obtainable with motors having smaller numbers of poles, such as two pole motors, is most desirable in those applications where the effectiveness of the motor is measured by its speed. This occurs, for instance, in almost all pumping applications including the refrigerating system of the modern electric household refrigerator.

Despite the desirability of two pole motors for such applications, it is very frequently found that motors having considerably higher numbers of poles are being utilized. This arises from the fact that various difficulties present themselves to the mass production of two pole induction-type motors. Among the most important of these difficulties, and one which has, to a considerable extent, held back such mass production, is the fact that the span of the outer coils in a two pole motor is so great (close to 180°) that their end turns extend straight across the bore of the stator when formed by machine. Attempts to overcome the difficulty by first pre-winding the coils and then placing them in the slots have also been hindered by the obstacle of the large coil span. To remedy the situation, it is most desirable that suitable means be provided for preforming the coils, and that after the formation of the coils, these means be directly associated with the stator core which is to receive the coils so that the same part which helped to form the coils is used to maintain the coils in proper position for insertion in the stator slots.

It is, therefore, an object of this invention to provide a coil winding and inserting machine which will provide accurate forming and positioning of coils in the slots of a stator core member, particularly where the coils are to form a two pole winding.

A further object of the invention is to provide a machine which will accurately form and position coils in a stator core member by direct cooperation of part of the coil forming means with the stator to be wound.

Yet another object of the invention is to achieve the desired cooperation between the coil form and the stator core through the use of parts which are to a substantial extent movable in a simple rectilinear sense, i.e., axially, between a winding position and a coil inserting position.

Further objects and advantages of this invention will become apparent and the invention will be better understood by reference to the following description and the accompanying drawings, and the features of novelty which characterize this invention will be pointed out with particularity in the claims annexed to and forming a part of this specification.

In one aspect thereof, the invention provides, in a coil winding machine, a coil form which comprises a plurality of axially arranged sections for winding coils of different sizes. Core holding means are provided so as to be substantially axially aligned with the coil form. Divider plates are secured in the coil form so that, after a winding operation, they are axially movable over each coil and into the bore of a stator core which is secured in the holding means. Pusher plates are also secured in the coil form alternately with the divider plates. The pusher plates are also axially movable, subsequent to the movement of the divider plates, to a position in the stator bore so as to force the coils into the slots of the core while the divider plates act as guides.

By the particular arrangement of the divider plates and the pusher plates in the coil form, and their relationship to the holding means for the stator, the coils may easily be formed and then moved into position in the stator slots by direct cooperation between the coil form and the stator, and by simple rectilinear movement of the parts of the coil form.

In the drawings, Figure 1 is a side elevational view, partly broken away, of the improved coil winding machine of this invention;

Figure 2 is an end elevational view of the machine;

Figure 3 is a view along line 3—3 in Figure 1;

Figure 4 is a view along line 4—4 in Figure 1, and is in essence a continuation of the right end of Figure 3;

Figure 5 is a view along line 5—5 in Figure 4;

Figure 6 is a view along line 6—6 in Figure 4;

Figure 7 is a view along line 7—7 in Figure 4;

Figure 8 is a view along line 8—8 in Figure 4;

Figure 9 is a view along line 9—9 in Figure 4;

Figure 10 is a view along line 10—10 in Figure 4;

Figure 11 is a fragmentary side view, partly broken away, of that part of the coil form shown in the left half of Figure 4 at a particular point in the operating sequence of the machine;

Figure 12 is an enlarged fragmentary view, partly broken away, of that portion of the coil form shown at the left end of Figure 11;

Figure 15 is a view along line 15—15 in Figure 1;

Figure 19 is a view in perspective, partly broken away, of the machine during the coil winding portion of the operating sequence;

Figure 20 is a view in perspective, similar to that of Figure 19, at that point in the operating sequence of the machine when the formed coils are being inserted into the stator slots;

Figure 21 is an enlarged view in perspective of a divider plate and a pusher plate cooperating to insert a formed coil in the slots of a stator core; and Figure 22 is a view along line 22—22 in Figure 20.

Figure 13:
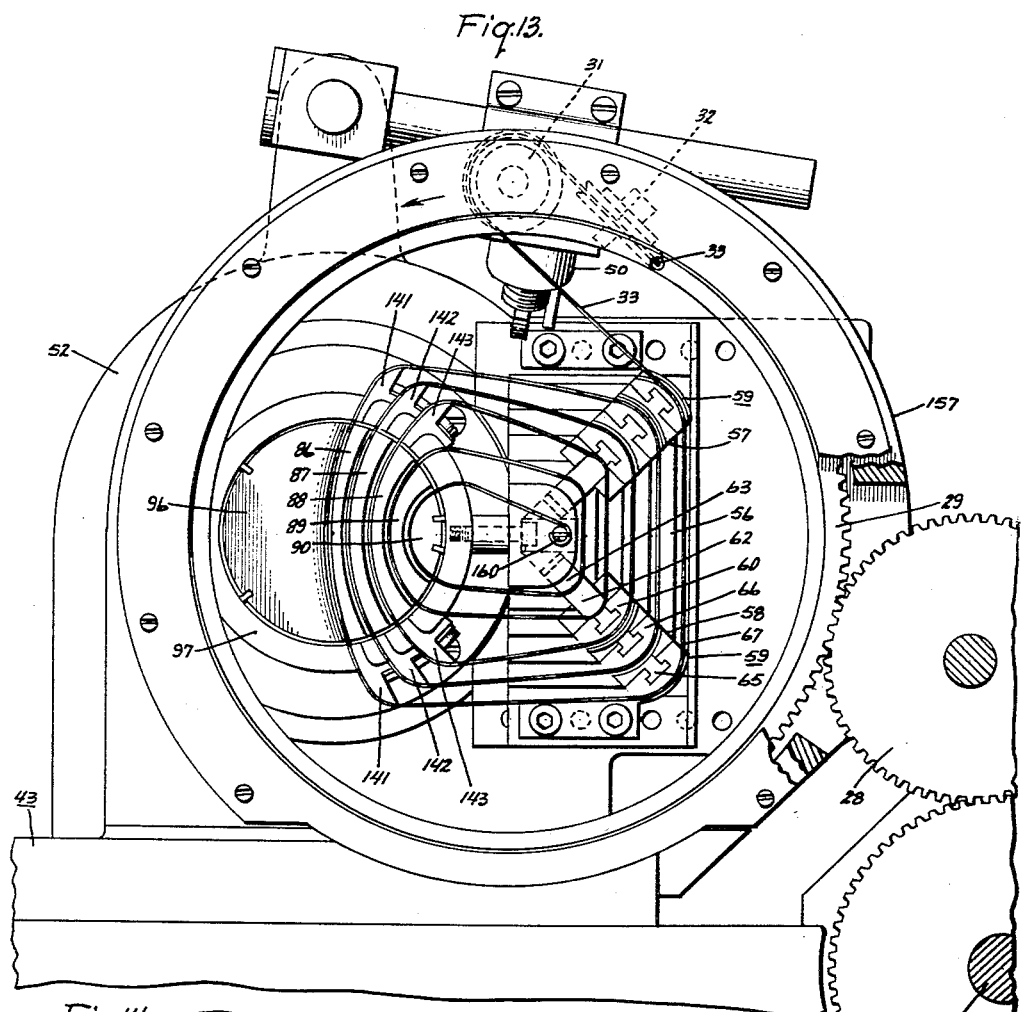
Figure 13 is a view along line 13—13 in Figure 1.

Referring now to the drawings, and particularly to Figure 1, the general construction of the machine will be briefly described prior to the explanation of the detailed construction of all the parts thereof. Operating means, including a suitable motor 1 and a clutch-brake mechanism, 2 are operatively connected through belts 3 to cause rotation of a lead screw mechanism 4 and a drive shaft 5 (Figure 19). Shaft 5 causes rotation of a flyer 6 around a stationary coil form 7 in order to wind coils thereon. The proper stopping point for shaft 5, at which clutch-brake 2 will automatically stop the connection of motor 1 to belt 3, is determined by a counter mechanism 8 which is mounted to cooperate with a cam member 9 moved through the rotation of lead screw 4. After the winding operation is complete, part of form 7 moves into the bore of a stator member 10 secured in a holding member 11 to position the formed winding in the slots 12 of the stator (Figure 20).

*Driving system*

As stated, suitable driving means such as electric motor 1 may be provided in combination with conventional clutch-brake apparatus, generally indicated at 2, so as to transmit driving force through a pulley member 13 to belts 3 which in turn transmit it to pulley member 14. Referring particularly to Figure 2, a gear 15 is mounted on the same shaft 16 as pulley 14 and is in engagement with a gear 17 which, together with gear 18, is mounted on shaft 19 journaled in the housing 52 of the machine. Gear 18 is in engagement with a gear member 20 which causes rotation of shaft 42 which extends into a standard gear box 21. Manual adjustments in box 21 may be made through a lever 22 to achieve changes in the gear ratio to lead screw 4, as is standard in many machine arts such as, for instance, the lathe art.

Gear 15 also engages a gear 23 which is mounted on a shaft 24 journaled in the housing 52. A gear 25 is also mounted on shaft 24, and is in engagement with a gear 26 which drives main drive shaft 5. Referring now particularly to Figure 13, a gear 27 is provided at the other end of shaft 5 and meshes with a gear 28 which in turn engages a ring gear 29 mounted in housing 157 on bearings 158 (Figure 4). Ring gear 29 carries the flyer 6 which is integrally secured to flange 30 formed on the ring gear. In essence, the flyer includes a pair of pulley members 31 and 32 over which is threaded wire 33 (Figure 1). The wire is fed to the flyer 6 from any suitable source such as a spool 34 which has a pulley 35 over which the wire passes to a pair of pulleys 36 and 37 which in turn feed the wire to the flyer as described. Pulleys 36 and 37 are mounted on an arm 38 pivotable about a pin 39 which is mounted in the housing 40 of a tailstock-like part 41 which supports the stator holder 11.

As can best be seen in Figure 1, it is necessary for the carriage 43 which carries flyer 6 to move in an axial direction as the flyer rotates so that wire will be wound into coils on the full length of form 7. While the rotational movement of flyer 6 is achieved through the gear arrangement described above, the axial motion of carriage 43 is provided through engagement of half nuts 44 on the carriage (Figure 15) with the lead screw 4. As the lead screw rotates, through the gear sequence described above, it causes axial movement of half nuts 44 and carriage 43 which has portions 45 and 46 mounted in sliding relation of a base 47. During the winding operation, the lead screw 4 rotates to cause the carriage 43 to traverse axially from one end of coil form 7 to the other.

It is, of course, important that the proper predetermined number of turns be provided on coil form 7 in the course of a winding operation. To achieve this, any standard counter arrangement may be provided such as that generally indicated at 8. The counter is secured to the carriage 43 and is so arranged that when it abuts against suitable limiting means, such as cam member 9, it will cause the clutch-brake mechanism 2 to stop the winding operation (the precise construction connecting the counter to the clutch-brake mechanism is irrelevant and is not shown).

A device 50 including blades 51 is mounted on the housing 52 of the machine so as to snip the wire 33 at the end of the winding operation. It is necessary that the positioning of the flyer pulley 31 to be very exact for the wire cutting device 50 to be able to achieve its function properly each time. While counter mechanism 8 is effective to stop the winding operation after a predetermined number of turns, it normally does not provide the exact positioning necessary for operation of wire snipping device 50. However, (see Figure 2) the desired precise positioning of the flyer may easily be provided through a cam 52 and a cam follower member 53 which is vertically reciprocable through a suitable rod 54 actuated in any desired manner such as by a cylinder 161. Counter mechanism 8 engages part 9 after commencement of the last turn of wire; when this occurs, clutch-brake 2 stops the rotation of the flyer, and an actuating impulse is sent to cylinder 161 to cause cam follower 53 to move up into engagement with cam 52. Previous to this time, the cam has been rotating with the shaft 16 and flyer 6. When the cam follower moves up, it moves into abutment with the cam 52; the combination of the pressure on follower 53 and the shape of the cam makes the cam "walk" around until follower 53 abuts against cam part 55, as shown. This completes the last revolution of shaft 16 and therefore continues transmission of motion to flyer 6 until it reaches the precise point desired so that the wire cutting operation may be effected.

Any suitable means may be provided to return the carriage 43 to its starting position at the end of a coil forming operation. In the present arrangement, means (not shown) are provided to cause disengagement of half nuts 44 from lead screw 4, and a piston and cylinder arrangement 48 is mounted in a suitable opening 49 in the base 47 so that it can slide carriage 43 back to its starting position.

*The coil form*

Referring now primarily to Figures 3 and 4, and also to Figures 5 to 22, the structure of the coil form 7 will be described. Figure 4 relates to that part of the coil form on which the wire 33 is actually wound, while Figure 3 illustrates the parts of the coil form which are normally contained within housing 52 (Figure 1). The construction of the coil form 7 may best be understood if it is kept in mind that the form is actually made up of two substantially separate constructions which are cooperately combined with each other to make up the form; one of the constructions on one side of the form has the sole function of positioning the wire and then, at a suitable later time, releasing it, while the other construction on the other side of the form has the important additional function of actually transporting the wire, after it is formed into coils, into the slots of a stator core.

Referring now primarily to Figures 4, 11, 12, 13, and 14, coil form 7 includes a part 56 (Figure 13) which is provided with a pair of slots 57 and 58. In each of the slots there is provided an axially extending radially retractable wire receiving member 59 which may have at least part of its outer surface formed into a series of aligned grooves 61 with each groove being arranged to receive and hold one turn of wire during the forming of a coil. However, as shown at surfaces 62 and 63, the grooves 61 are optional and are normally provided only in the formation of large coils since they are not considered necessary in the formation of smaller coils with fewer turns of wire. Three of the grooved portions 60, 66 and 67 habe been provided in this particular case; together with portions 62 and 63, they provide wire receiving surfaces aranged to form coils of five different sizes.

Figure 14:
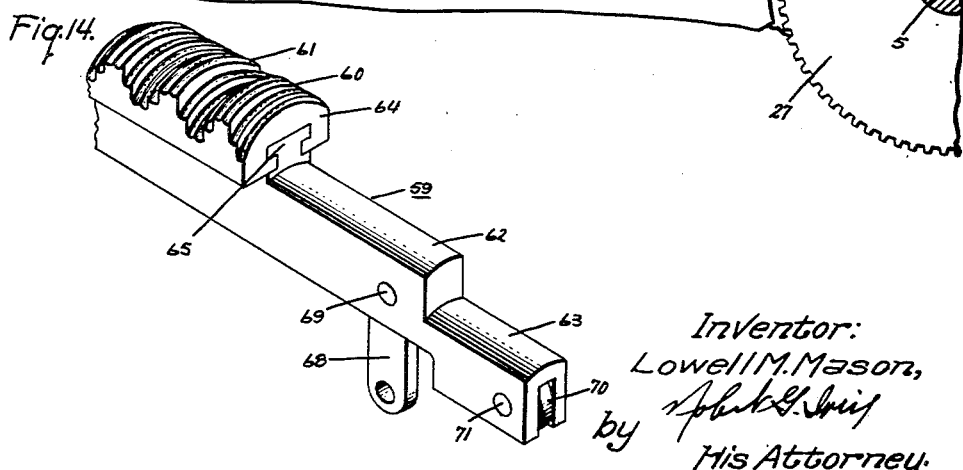
Figure 14 is an enlarged view in perspective of a part of the coil form of the machine shown in Figure 13.

As shown in Figure 14, each individual surface portion may be formed as a separate part 64 adjustably mounted on a keyway 65. With the arrangement of the portions on keyway 65, each one is slidably adjustable so as to vary the number of turns which will be formed on that particular coil.

In order to release coils which have been wound over surfaces 63, 62, 60, 66, and 67, it is necessary to retract members 59 in slots 57 and 58 of member 56. A linkage member 68 and a roller member 70 are respectively rotatably mounted on pins 69 and 71 at the outer end of each member 59. A similar arrangement is provided at the other end of each member 59, where linkage member 72 is mounted on pin 73 and roller 74 is mounted on pin 75. At its other end, linkage member 68 is pivotably mounted, by means of a pin 76, on an elongated retracting member 77 which, as will be described below, is movable axially relative to the direction of rotation of flyer 6. Linkage member 72 is similarly mounted to member 77 by means of a pin 78. Member 77 is rigidly supported at its one end by a connecting member 79 and a rod 80, with rod 80 being supported for reciprocating movement in housing part 81 and housing 52. Thus, retracting member 77 provides a rigid support for wire forming parts 59 during a coil forming operation.

When it is desired to release the wire from the tight engagement with the surface parts 67, 66, 60, 62, and 63, rod 80 is caused to move to the right (as viewed in Figure 3) in a manner which will be more fully explained below. This movement to the right carries with it member 7 since it is rigidly secured to move with rod 80. This motion of member 77 carries with it the bottom end of linkage members 72 and 68 so that they pivot about pins 78 and 76. Member 59 is secured against axial movement and is radially guided between stationary housing part 82 and part 83 which is secured through any suitable means, such as a bolt 84, to a stationary member 85 which will be more fully described below. Part 83 may incidentally, as shown, be provided with a small hook like extension 160 to which the starting end of the wire may be hooked before each coil winding operation. With the above arrangement, the axial motion of member 77 causes member 59 to be pulled downwardly by linkage members 72 and 68 as they pivot about their respective pins 73 and 69. A suitable space 86a is provided in which the member 59 can move inwardly toward member 77, with the roller members 74 and 70 riding on parts 82 and 83 respectively. Thus, the movement of rod 80 to the right is effective to cause retraction of the coil form part 59 and disengagement thereof from the wire which has been wound on its surface parts 67, 66, 60, 62, and 63. Figure 11 shows in dotted outline the expanded position of members 59 in which the winding operation was performed, and in solid outline the retracted position. For greater clarity of understanding, an enlarged view of part 59 in its collapsed position is shown in Figure 12. As seen in this figure, wire 33 of which the coil is formed has sufficient rigidity to remain substantially in its coiled form despite the retraction of the coil form part.

The other part of the coil form 7 is formed principally of a plurality of flat elongated axially movable divider plates 86 and 89 to a stationary member 90 which are separated by a plurality of flat elongated axially movable pusher plates 91 to 95. The outermost pusher plate 91 supported by an elongated slide member 96, and all of the divider plates, the pusher plates, the slide, and the stationary member are mounted within a tubular sleeve 97 which is secured within the housing 52. The arrangement of the divider plates, stationary member 90, pusher plates, and slide 96 within tubular sleeve 97 can best be understood from an examination of Figures 3 to 9. As can be seen in Figure 4, sleeve 97 has a forwardly extending projection 85, which has already been mentioned. In addition to its already described function, projection 85 provides support for the stationary plate 90 which has a portion 100 extending beyond the end of portion 85 for a purpose which will be described herebelow.

Slide 96 is provided with a recess 109 in which a spring 110 exerts pressure on a member 111 slidably mounted in the recess. The motion of sliding member 111 is limited by means of a suitable pin 112 secured within the slide as shown. The front end of member 111 abuts the back of a lever 113 which pivots about a pin 114 secured in slide 96. Lever 113 has a front section 115 which is arranged to enter an opening 116 provided in divider plates 86 to 89 and pusher plates 91 to 94. Spring 110 causes part 111 to pivot lever 113 about pin 114 so that front section 115 is biased to enter slot 116. In operative engagement with the back of slide 96, there is provided a piston rod 107 which is actuated in the normal manner by means of a cylinder 108 (Figure 1). When piston rod 107 moves the slide 96 forward, lever 113 will be in the position shown in solid outline in Figure 3 and will consequently push divider plates 86 to 89 and pusher plates 91 to 94 forward.

Near their front ends, the divider plates 86 to 89 are provided on their sides with small projections 117 to 120 respectively. As the divider plates are moved forward, they enter the bore of stator core 10 until the small projections 117 to 120 respectively strike against the face of the stator member 10 to create resistance to further forward movement of the divider plates. That portion of each divider plate which is engaged by lever section 115 is slanted, as shown at 121, so that resistance to movement of a divider plate will cause section 115 of lever 113 to slip down and cease to exert pressure on that divider plate. This happens to divider plates 89, 88, 87 and 86 in that sequence, until finally lever 113 is in the position shown in dotted outline in Figure 3 and has ceased to cause forward movement of the divider plates and pusher plates. The additional movement which is required (as will be explained below) of the pusher plates is then supplied when the surface 122 of back part 101 of slide 96 comes into engagement with the back of each pusher plate and pushes it forward.

When piston rod 107 pulls slide 96 in the opposite direction to return all the parts to starting position after a coil inserting operation, it carries with it pusher plate 91 which is rigidly secured to it by pin 123. Each other pusher plate is provided with a pair of projecting parts as shown at 124 and 125 for pusher plate 92 and at 126 for pusher plate 93. As plate 91 moves back, pin 123 engages stop 124 on plate 92 and thus pulls plate 92 back with it; by the same token, projection 125 on plate 92 engages projection 126 on plate 93 and pulls it back. By this arrangement, all the pusher plates are returned to their original positions. A plurality of thin elongated bolts 102 to 105 are threaded into the ends of divider plates 86 to 89 respectively; the bolts extend through slide portion 101 in slidable relation therewith and have their heads normally positioned within a recessed portion 106 provided at the back of slide 96. The divider plates are carried back, as slide 96 moves back, by engagement of the heads of bolts 102 to 105 with the surface of recess 106 provided in the back of slide 96.

Figure 16:
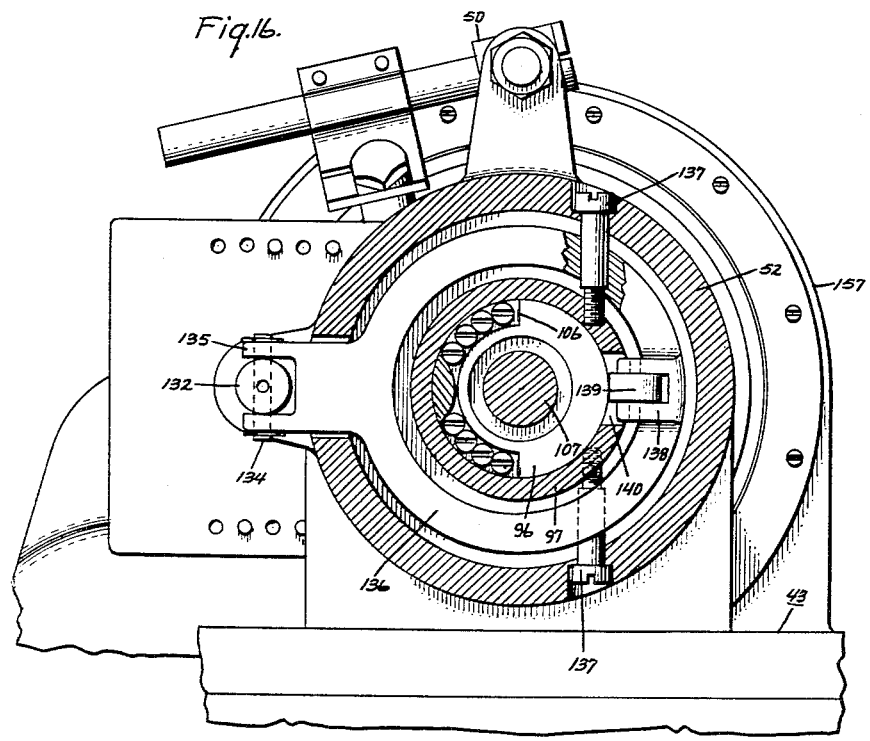
Figure 16 is a view along line 16—16 in Figure 3.
Figure 17:
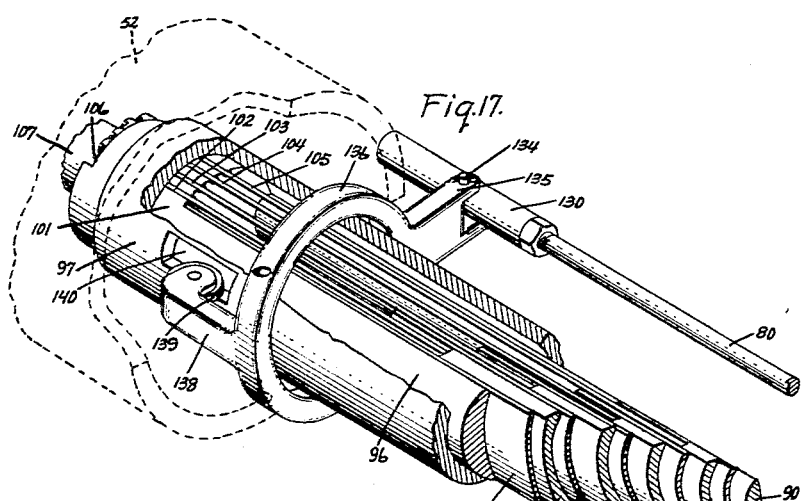
Figure 17 is a view in perspective, partly broken away, of that part of the machine shown in Figure 3.
Figure 18:
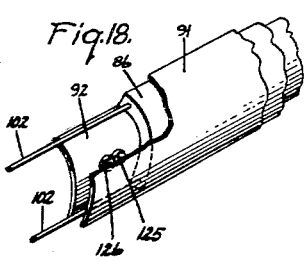
Figure 18 is a fragmentary view in perspective, partly broken away, of an additional part of the machine shown in Figure 3.

The movement of slide 96 also controls the movement of retracting member 77 which has been described above. As has been explained, rod 80 controls the movement of member 77. Rod 80 is normally biased to its forward position—in which the member 59 is collapsed—by a spring member 127 arranged between housing projection 128 and flange 129 on rod 80. However, at its back end, rod 80 is rigidly secured to a part 130 which has a slot 131 in which is mounted a slide 132 biased to its forward position by a spring 133. A pin 134 hingedly connects the supper portion 135 of member 136 to slide 132 and therefore to rod 80. Member 136 is pivotably mounted on pins 137 which are secured in the housing 52 of the machine (Figures 16 and 17). Member 136 is also provided with an arm 138 at the end of which there is provided a roller member 139 which is in engagement with slide 96 through an opening 140 provided at the back of sleeve 97. As the slide starts to move forward to carry the divider plates and pusher plates, as described above, roller 139 will merely rotate. However, after the back of slide 96 moves past the roller, springs 133 and 127 will cooperate to pivot member 136 about its pins 137. Thus, the spring 127 is free to force rod 80 to the right to cause the collapse of member 59 through retracting member 77, as described above. When slide 96 moves back after a coil inserting operation, it engages the roller 139 and forces part 136 to pivot again about pins 137, thereby pulling rod 80 back and causing member 77 to move coil forming members 59 to their expanded position for the next coil forming operation. It can thus be seen that the movement of slide 96 controls the movement and the sequence of movement of all parts of the coil form 7.

Reference to Figures 4 and 19 makes it clear that the divider plates in their retracted positions and stationary part 90 cooperate with the surface portions of member 59 to provide forming portions for coils of predetermined sizes. Thus, member 90 and surface 63 provide the contour of the form for the smallest coil, divider plate 89 and surface 62 form the second smallest coil, and divider plates 88, 87 and 86 cooperate with surface members 60, 66 and 67 respectively to form coils of increasing size. In their normal retracted positions, each pusher plate is covered by the divider plate overlying it.

The formation of coils of proper span may effectively be helped by providing suitable parts such as 141, 142, and 143 (Figure 20) on each side of the divider plates in close cooperation therewith. Parts 141, 142, and 143 are stationary and do not move forward with the divider plates, inasmuch as it is necessary (as will appear more clearly below) that the divider plates fit snugly within the bore of stator 10 as shown in Figure 22.

*Stator holding assembly*

During the coil winding and coil inserting operations, the stator core 10 which is to receive the formed coils is held within a member 11 which, as shown in Figures 20 and 21, is preferably in the form of a hollow half cylinder. The stator core 10 is held in holder member 11 by any preferred method; in the arrangement illustrated, stator 10 abuts against a shoulder 144 (Figure 4) provided on the inside surface of holder member 11 and is secured there by wedging members 146 which press against the face of stator core 10. A pin 147 (Figure 10) is biased by a spring 148; as stator 10 is inserted in member 11, pin 147 is forced back. When the stator is fully seated, the spring pressure forces pin 147 out against the stator to inhibit any tendency of the stator to roll out of member 11. Proper rotary positioning of stator core 10 against shoulder 144 may be achieved by any standard method such as, for instance, providing a suitable key 145 projecting from member 11 so that when the stator member is properly positioned, key 145 enters a keyway 162 provided on the periphery of stator core 10.

Holder member 11 is secured, in axial alignment with the divider and pusher plate portion of coil form 7, at the end of a rod 149 which is actuated back and forth by suitable means such as, for instance, a cylinder 150. The remainder of the stator holding assembly 41 on which the cylinder 150 and the stator holder 11 are secured remains stationary, secured to the base by suitable means such as a nut and bolt arrangement 151, during the entire operation.

During a coil winding operation, the stator holder 11 is in the position shown in Figure 19, with respect to coil form 7. In this position, the pulley 37, which together with pulley 36 is secured to arm 38 of the stator holding assembly 41, is positioned between and substantially in axial alignment with the coil form 7 and the stator core 10. Subsequent to the coil winding operation, i.e., during a coil inserting operation, arm 38 is retracted by being pivoted around pin 39 by any suitable means such as a cylinder and piston assembly 152 secured to arm 38 at 153. As soon as arm 38 has moved out of the way, cylinder 150 is caused to operate to force piston rod 149 to carry stator holder 11 to the left as viewed in Figures 1 and 4 until the end surface of the stator core 10 is engaged by shoulder 154 on member 90. In this position, the top 100 of member 90 extends into the bore of stator 10 against the inner surface thereof (Figure 22).

A baffle member 155 is secured to stator holder 11 by any suitable means, such as threaded member 156, so as to extend from the front of holder 11. Member 155 is positioned so as to guide that part of the coils which was formed over members 59 as the coils are forced into the slots 12 of stator 10.

*Operation*

Referring now to Figures 1, 3, 4, 19, 20, 21 and 22, the operation of the improved coil winding machine will be described. Flyer 6 is substantially in the position shown in Figure 4, ready to start a coil winding operation, and coil form 7 is free of coils with the divider and pusher plates retracted and the members 59 expanded, as shown. After the starting end of the wire has been secured to hook 160, motor 1 operates through clutch-brake 2 and belts 3 to cause rotation of lead screw 4 and drive shaft 5. Rotation of drive shaft 5 causes rotation of the ring gear 29 which carries flyer 6 with it. Arm 38, carrying pulleys 36 and 37, is substantially in the position shown in Figure 19 with pulley 37 in position to feed wire to the pulleys 31 and 32 of flyer 6. Consequently, as the flyer rotates, wire is wound on the coil form 7. The rotation of lead screw 4 causes carriage 43 carrying flyer 6 to move to the left at the proper speed so as to form the desired number of turns for each coil. After flyer 6 has started the last of the predetermined number of turns, the lead screw 4, through its rotation, carries counter 8 into operative engagement with cam member 9 so as to cause the clutch-brake mechanism to disconnect pulley 13 from motor 1 and brake the motion thereof. At the same time, rod 54 (Figure 2) is actuated to cause cam follower 53 to rise and be positioned so as to engage part cam 52 in order to move flyer 6 to an exact predetermined position.

When flyer 6 is stopped in the proper position, the wire 33 extending between the last turn on form 7 and the pulley 31 passes between the blades 51 of wire snipper 50 which is then actuated to cut the wire. Cylinder 48 then is actuated by suitable means (not shown) to return carriage 43 and flyer 6 to the operative starting position shown in Figure 4.

The arm 38 is then retracted to the position shown in dotted outline in Figure 1 and stator holder 11 is then moved to the left (Figure 4) by piston rod 149 until the end surface of stator 10 abuts shoulder 154 of stationary member 90. At this point, cylinder 108 is operated to cause the piston rod 107 to move slide 96 forward to the right, as viewed in Figure 3. At first, the movement of the slide causes section 115 of member 113 to move divider plates 86 to 89 and pusher plates 91 to 94 forward. When the back of the slide 96 has moved past the opening 140 in sleeve 97, the pressure of spring 127 is no longer resisted by the engagement of roller 139 of the surface of slide 96, and the spring forces rod 80 to the right. This movement of the rod carries with it connecting part 79 and retracting member 77 which, as explained above, effects the collapse of members 59 so that the surface parts thereof move from the positions shown in dotted outline by the numerals 67, 66, 60, 62 and 63 in Figure 11 to the position shown in solid outline. At this point, the divider plates have already moved forward a substantial distance over each of the coils on form 7 (slide 96 performs a divider plate function by moving over the largest coil) to retain them in proper position to be moved; thus, the collapse of members 59 does not substantially change the positioning of the coils but merely releases them so that they can be moved without interference from the surfaces of members 59.

The divider plates continue to be moved forward by slide 96 until each divider plate extends into the bore of stator member 10 (Figures 20 and 22). Reference to Figure 22 in particular shows that each divider plate fits snugly in the bore, with each side in close proximity to the inner surface of the bore between two of the slots 12. At this point, forward motion of the divider plates is stopped by the engagement of stops 117 to 120 against the end of stator 10. Due to the fact that the different divider plates originally extend forward different amounts so as to cooperate with different portions of members 59 in the coil forming operation, divider plate 89 will first reach its position within stator 10, then plate 88, then plate 87 and finally divider plate 86. When divider plate 89 reaches its limiting position because of engagement of stop 120 with core 10, lever section 115 will slip out of engagement with it because of the slant of surface 121. The same will occur when divider plate 88 reaches its limiting position, and again for divider plates 87 and 86 consecutively.

After all the divider plates have reached their final operative positions, the pusher plates 91 to 95 still need to be advanced to push the coils between the divider plates. This motion is achieved when the front surface 122 of the back portion 101 of slide 96 engages the back of each of the pusher plates to force them forward. As each pusher plate moves forward (plate 95 between part 90 and divider plate 89, plate 91 between slide 96 and divider plate 86, and the other pusher plates each between two divider plates), it engages one of the coils which has just been formed by the rotation of flyer 6 around coil 7. Since each pusher plate is sliding between two guiding surfaces, the coils must yield and allow themselves to be forced along by the pusher plates. This movement continues until, as shown best in Figure 21, each pusher plate starts to slide into the bore of core member 10 with each side thereof in alignment with one of the slots 12 of the stator 10 (Figure 22). This continued movement forces the coils into the slots. The movement of the pusher plates continues until, as shown in Figure 20, each pusher plate has moved all the way through the bore of stator 10 so as to force each coil completely into the two slots at the sides of the pusher plate. The position and size of each pusher plate determines in which slots the coil will be placed; since this is correlated with the forming of different sized coils on form 7, it can be seen that the largest coils, those which extend over almost 180° span, can be positioned in their almost diametrically opposite slots just as easily as those which are relatively close together.

That part of each coil which was directly over a surface of members 59 is not engaged by the pusher plates and therefore trails the remainder of the coil as it is pushed. These trailing portions of the coils are destined to become the end turns at one end of the stator; in order to position them properly baffle 155 is provided. As each coil comes into contact with the baffle, it is forced to slide inwardly until it is substantially in alignment with the rest of the coil which extends through the slots of the stator.

After these operations, the direction of movement of piston rod 107 is reversed so as to return the divider plates and the pusher plates to the coil winding position, and so as to cause retracting member 77 to move members 59 out to their expanded position in readiness for a coil forming operation. The holding member 11 is moved axially away from coil form 7, and arm 38 is moved back down to its coil winding position. The apparatus is then ready for the next coil forming and inserting operation.

It is clear from the above description that the invention provides an improved coil winding and inserting machine for the effective and rapid forming and insertion of coils in dynamoelectric machine cores, and that it is particularly effective in connection with coils for two pole motors.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. In a coil winding and inserting machine having a coil form comprising a plurality of axially arranged sections for forming coils of different sizes and stationary core holding means substantially axially aligned with said form, coil insertion means comprising divider plates secured in said form axially movable subsequent to a winding operation over the coils respectively and into the bore of an internally slotted core secured in said holding means, and pusher plates secured in said form alternately with said divider plates, each of said pusher plates having a portion aligned with a different slot in the core and being axially movable relative to said divider plates into the bore of the core thereby to force the coils into the slots of the core while said divider plates act as guides.

2. In a coil winding and inserting machine having a coil form comprising a plurality of axially arranged sections for winding coils of different sizes and stationary core holding means substantially axially aligned with said form, coil insertion means comprising divider plates secured in said form and axially movable subsequent to a winding operation over the coils respectively, each said divider plate being formed to have each side thereof move into close proximity with the bore of an internally slotted core between two of the slots formed in said core, and pusher plates secured in said form alternately with said divider plates, said pusher plates being axially slidable relative to said divider plates respectively to positions in the bore of said core, each of said pusher plates having its sides respectively in alignment with two of the slots of the core whereby said pusher plates are adapted to force coils formed on said coil form into the slots of the core while said divider plates act as guides.

3. In a coil winding and inserting machine having a coil form comprising a plurality of axially arranged sections for winding coils of different sizes and stationary stator holding means substantially axially aligned with said form, coil insertion means comprising divider plates secured in said form and axially movable subsequent to a winding operation over the coils respectively, each said divider plate being formed to have each side thereof move into close proximity with the bore of a slotted stator between two of the slots formed in the stator, pusher plates secured in said form alternately with said divider plates, said pusher plates being axially movable relative to said divider plates respectively to positions in close proximity with the bore of said stator, each of said pusher plates having its sides respectively in alignment with two of the stator slots, stop means formed on said divider plates to limit movement thereof into the core of the stator, a slide member movably secured to said coil form, means on said slide member engaging said divider plates and said pusher plates to slide them into the stator bore upon movement of said slide in one direction, and means on said slide member engaging said divider plates and said pusher plates to withdraw the same upon reverse movement of said slide member.

4. In a coil winding and inserting machine having a coil form comprising a plurality of axially arranged sections for winding coils of different sizes and stationary stator holding means substantially axially aligned with said form, coil insertion means comprising a plurality of divider plates secured in said form, said divider plates being formed as elongated substantially flat members and being normally positioned with their ends respectively completing the contours of said coil form sections, said divider plates being axially movable subsequent to a winding operation over the coils respectively, each said divider plate being formed to have each side thereof move into close proximity with the bore of a slotted stator between two of the slots formed in the stator, and a plurality of pusher plates secured in said form alternately with said divider plates, said pusher plates also being formed as elongated substantially flat members and being normally positioned with their ends covered by the next outer divider plate, said pusher plates being axially movable relative to said divider plates respectively to positions in close proximity with the bore of said stator, each of said pusher plates having its sides respectively in alignment with two stator slots thereby to force said coils into the slots while said divider plates act as guides.

5. In a coil winding and inserting machine having a coil form comprising a plurality of axially arranged sections for winding coils of different sizes and stationary stator holding means substantially axially aligned with said form, coil insertion means comprising a plurality of divider plates secured in said form, said divider plates being formed as elongated substantially flat members and being normally positioned with their ends respectively completing the contours of said coil form sections, said divider plates being axially movable subsequent to a winding operation over the coils respectively, each said divider plate being formed to have each side thereof move into close proximity with the bore of a slotted stator between two of the slots formed in the stator, a plurality of pusher plates secured in said form alternately with said divider plates, said pusher plates also being formed as elongated substantially flat members and being normally positioned with their ends covered by the next outer divider plate, said pusher plates being axially movable relative to said divider plates respectively to positions in close proximity with the bore of said stator, each of said pusher plates having its sides respectively in alignment with two stator slots, a slide member adjacent said divider plates and said pusher plates, a latch member mounted in said slide with a portion engaging said divider plates, said slide member being movable axially, said latch member being arranged to engage said divider plates to move them into the bore of the core upon axial movement in one direction by said slide, means securing said divider plates to the back of said slide to cause said divider plates to be pulled by said slide when it moves back in the opposite direction, said slide further being formed to engage said pusher plates upon movement in either direction to cause them to move axially between said divider plates.

6. In a coil winding and inserting machine having a coil form comprising a plurality of axially arranged sections for winding coils of different sizes and stationary stator holding means substantially axially aligned with said form, one side of said form having an axially extending radially retractable wire receiving member, the other side of said form having coil insertion means comprising a plurality of divider plates secured in said form with their ends respectively completing the contours of said coil form sections, said divider plates being axially movable substantially simultaneously with retraction of said wire receiving member and subsequent to a winding operation over the coils respectively into the bore of a stator secured in said holding means, and pusher plates secured in said form alternately with said divider plates, said pusher plates being axially movable to a position within the stator bore with their sides respectively in alignment with predetermined stator slots after said divider plates thereby to force coils into the stator slots while the divider plates act as guides after the retractable wire receiving member has released the coils for movement by the pusher plates.

7. In a coil winding and inserting machine having a coil form comprising a plurality of axially arranged sections for winding coils of different sizes and stationary stator holding means substantially axially aligned with said form, one side of said form having an axially extending radially retractable wire receiving member, retracting means for effecting retraction of said wire-receiving member subsequent to a coil forming operation thereby to disengage said wire-receiving member from the wires forming the coils, coil insertion means comprising a plurality of divider plates secured in said form on the other side thereof, said divider plates being axially movable subsequent to a winding operation over the coils respectively, each said divider plate being formed to have each side theerof move into close proximity with the bore of a slotted stator between two of the slots formed in the stator, a plurality of pusher plates secured in said form alternately with said divider plates, said pusher plates being axially movable relative to said divider plates respectively to positions in close proximity with the bore of the stator, said pusher plates being formed so that when within the stator bore the sides of each pusher plate are respectively in alignment with stator slots, a slide member adjacent said divider plates and said pusher plates and arranged in operative engagement therewith to move axially to a first position to move said divider plates and pusher plates into said stator bore and subsequently return to a second postion to move said plates out of said stator bore to the coil winding position, said wire retracting means including means biasing said wire receiving member to a retracted position, said slide being positioned to prevent retraction of said wire receiving member when said slide is in said second position, and to permit said biasing means to retract said wire receiving member during movement to said first position.

8. In a coil winding and inserting machine having a coil form, one side of said form having an axially extending radially retractable wire receiving member, the other side thereof having coil insertion means, said means having an axially extending elongated substantially flat divider plate normally positioned with its end in cooperative relation with said wire receiving member to complete the coil form contour, said divider plate being axially movable from said normal position, and an axially extending axially movable elongated substantially flat pusher plate secured in said form over said divider plate, said wire receiving member being in expanded position when said divider plate is in its normal position, and means to cause retraction of said wire receiving member as said divider plate is moved axially from its normal position.

9. In a coil winding and inserting machine having a coil form comprising a plurality of axially arranged sections for winding coils of different sizes and one side of said form having an axially extending radially retractable wire receiving member, the other side of said form having coil insertion means, said means comprising a plurality of elongated substantially flat divider plates normally positioned with their ends respectively completing the contours of said coil form sections, said divider plates being axially movable from said normal position, a plurality of axially movable elongated substantially flat pusher plates secured alternately with said divider plates and normally positioned to be covered by the next outer divider plate, an axially movable slide member adjacent said plates, means connecting said slide member to said divider plates and said pusher plates to cause the same to move in the same axial direction as said slide, means biasing said wire receiving member to a retracted position, said slide being positioned when said divider plates and said pusher plates are in their normal position to preclude operation of said biasing means, said biasing means being freed to cause retraction of said wire receiving member when said slide member moves said divider plates and said pusher plates a predetermined axial distance from their normal positions.

References Cited in the file of this patent

UNITED STATES PATENTS

| | | |
|---|---|---|
| 1,538,187 | Herrick | May 19, 1925 |
| 2,011,114 | Papin | Aug. 13, 1935 |
| 2,432,267 | Adamson | Dec. 9, 1947 |
| 2,445,986 | Adamson | July 27, 1948 |
| 2,506,173 | Polard | May 2, 1950 |
| 2,782,809 | Smallridge | Feb. 26, 1957 |